United States Patent [19]
Turk et al.

[11] Patent Number: 5,858,522
[45] Date of Patent: Jan. 12, 1999

[54] INTERFACIAL BLENDING AGENT FOR NATURAL FIBER COMPOSITES

[75] Inventors: David L. Turk, Stow; Otto Grill, Independence, both of Ohio

[73] Assignee: Formtech Enterprises, Inc., Stow, Ohio

[21] Appl. No.: 803,983

[22] Filed: Feb. 21, 1997

Related U.S. Application Data

[63] Continuation-in-part of Ser. No. 603,912, Feb. 22, 1996, which is a continuation-in-part of Ser. No. 113,989, Aug. 30, 1993, Pat. No. 5,700,555.

[51] Int. Cl.[6] ................................................. B32B 5/14
[52] U.S. Cl. .................. 428/308.8; 428/375; 428/378; 428/392; 428/393; 428/394; 428/395
[58] Field of Search ............................ 428/308.8, 375, 428/378, 392, 393, 394, 395

[56] References Cited

U.S. PATENT DOCUMENTS

| | | | |
|---|---|---|---|
| 1,966,856 | 7/1934 | Groff | 106/22 |
| 2,103,581 | 12/1937 | Gray | 106/22 |
| 2,365,400 | 12/1944 | Fikentscher | 260/88 |
| 2,993,022 | 7/1961 | Coler | 260/32.6 |
| 3,697,364 | 10/1972 | Boustany et al. | 161/59 |
| 3,770,537 | 11/1973 | Elton | 156/77 |
| 3,878,143 | 4/1975 | Baumann et al. | 260/17.4 |
| 3,888,810 | 6/1975 | Shinomura | 260/17.4 BB |
| 3,935,047 | 1/1976 | Shinomura | 156/163 |
| 3,943,079 | 3/1976 | Hamed | 260/17.4 BB |
| 3,954,555 | 5/1976 | Kole et al. | |
| 4,053,339 | 10/1977 | Story et al. | 156/62.2 |
| 4,168,251 | 9/1979 | Schinzel et al. | 260/17.4 R |
| 4,258,917 | 3/1981 | Murphy | 273/65 |
| 4,262,051 | 4/1981 | Welz et al. | 428/283 |
| 4,308,702 | 1/1982 | Rajewski | 52/519 |
| 4,376,144 | 3/1983 | Goettler | 428/36 |
| 4,396,039 | 8/1983 | Klenk et al. | 138/118.1 |
| 4,464,510 | 8/1984 | Cvikovazky et al. | 525/54.23 |
| 4,480,061 | 10/1984 | Coughlin et al. | 524/13 |
| 4,496,718 | 1/1985 | Rudy | 536/56 |
| 4,592,887 | 6/1986 | Bando et al. | 264/337 |
| 4,594,372 | 6/1986 | Natov et al. | 523/208 |
| 4,610,900 | 9/1986 | Nishibori | 428/15 |
| 4,612,224 | 9/1986 | Davis | 428/109 |
| 4,737,532 | 4/1988 | Fujita et al. | 524/13 |
| 4,776,784 | 10/1988 | Batiuk | 425/203 |
| 4,851,458 | 7/1989 | Hopperdietzel | 523/205 |
| 4,873,005 | 10/1989 | Hyde | 252/35 |
| 4,890,795 | 1/1990 | Da Re' | 241/3 |
| 4,904,523 | 2/1990 | Kampf | 428/288 |
| 4,915,764 | 4/1990 | Miani | 156/244.19 |
| 4,957,372 | 9/1990 | Meyer | 366/76 |
| 4,957,809 | 9/1990 | Davis | 428/283 |
| 5,008,310 | 4/1991 | Beshay | 524/13 |
| 5,082,605 | 1/1992 | Brooks et al. | 264/40.6 |
| 5,088,910 | 2/1992 | Goforth et al. | 425/142 |
| 5,100,109 | 3/1992 | Robbins, III | 256/59 |
| 5,155,146 | 10/1992 | Reetz | 523/222 |
| 5,164,432 | 11/1992 | Dehannau et al. | 524/13 |
| 5,169,712 | 12/1992 | Tapp | 428/315 |
| 5,296,176 | 3/1994 | Nakamura | 264/109 |
| 5,306,749 | 4/1994 | Columbus et al. | 524/13 |
| 5,340,642 | 8/1994 | Baumgartl et al. | 428/228 |
| 5,342,187 | 8/1994 | Ohanesian | 425/70 |
| 5,406,768 | 4/1995 | Guiseppe et al. | 50/730.4 |
| 5,441,801 | 8/1995 | Deaner et al. | 428/326 |
| 5,486,553 | 1/1996 | Deaner et al. | 524/13 |
| 5,498,384 | 3/1996 | Volk et al. | 264/122 |
| 5,502,088 | 3/1996 | Hododi | 524/34 |
| 5,534,327 | 7/1996 | Nishi et al. | 428/151 |
| 5,536,264 | 7/1996 | Hsueh et al. | 604/368 |
| 5,539,027 | 7/1996 | Deaner et al. | 524/13 |

FOREIGN PATENT DOCUMENTS

| | | |
|---|---|---|
| 586211 A1 | 3/1994 | European Pat. Off. |
| 586212 A2 | 3/1994 | European Pat. Off. |
| 586212 A3 | 3/1994 | European Pat. Off. |
| 586213 A1 | 3/1994 | European Pat. Off. |
| 24 27 080 A 1 | 12/1975 | Germany |
| 18 50 155 A1 | 6/1980 | Germany |
| 278246 | 11/1994 | Slovakia |
| 2034148 | 6/1980 | United Kingdom |

OTHER PUBLICATIONS

Kunstoffe German Plastics 80 (1990) 9. pp. 1008/1010.
Moller Lignodur Innefensterbanke (undated).

*Primary Examiner*—Helen L. Pezzuto
*Attorney, Agent, or Firm*—Oldham & Oldham Co., L.P.A.

[57] ABSTRACT

The invention describes a process for the preparation of a natural fiber and thermoplastic composite and the resulting products therefrom. The process includes the steps of mixing the natural fiber and the thermoplastic in a blender with a porosity aid and an interfacial agent to form a mixture; adding the mixture to a heated extruder; compressing the mixture with an extruder screw having a plurality of flight sections, at least one of the flight sections serving as a compression flight section which compresses the mixture by having its flights spaced closer together than other adjacent flight sections, and at least one other vent flight section which allows gaseous reaction products to be removed from the extruder through a vent in the extruder by having its flights spaced farther apart than the compression section, the vent flight section being positioned after the compression flight section; extruding the mixture through an extrusion die as a composite; and shaping the composite in a vacuum calibration device to a desired profile. The process further includes the step of co-extruding a second thermoplastic onto the natural fiber/thermoplastic composite for some applications (e.g., windows, doors and siding).

49 Claims, 6 Drawing Sheets

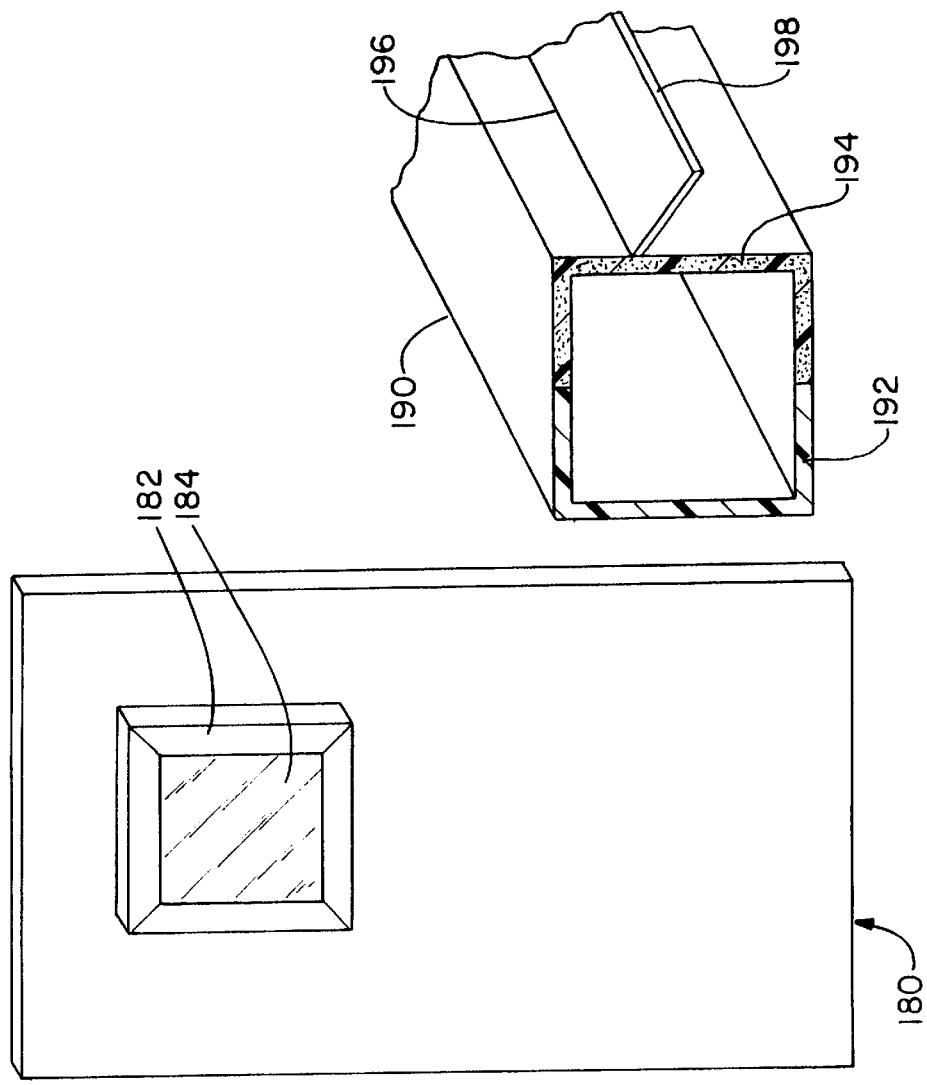
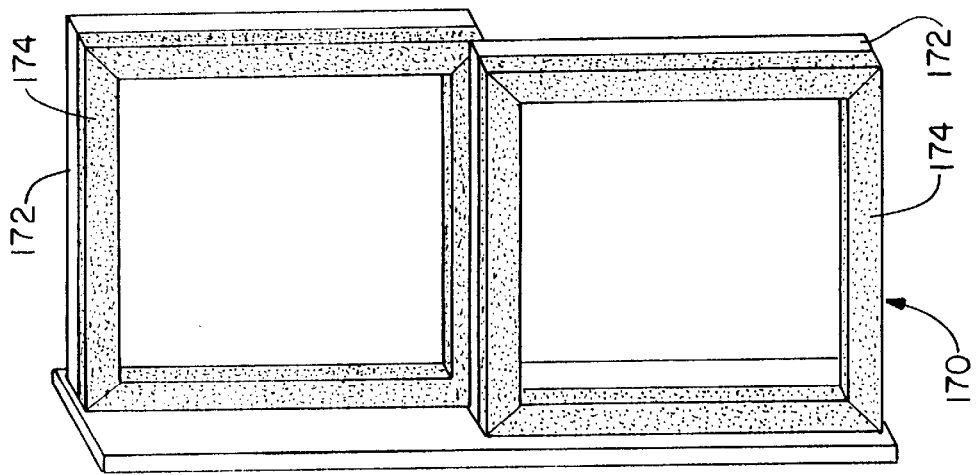

5,858,522

INTERFACIAL BLENDING AGENT FOR NATURAL FIBER COMPOSITES

This application is a continuation-in-part of application Ser. No. 08/603,912 filed on 22 Feb. 1996 allowed which is a continuation-in-part of application Ser. No. 08/113,989 filed on 30 Aug. 1993, now U.S. Pat. No. 5,700,555.

TECHNICAL FIELD

The invention described herein pertains generally to a process to make a stainable and paintable composite comprising a first plastic and an essentially homogeneous blend of a second plastic and natural fibers, particularly suitable for use as door and window components as well as siding applications.

BACKGROUND OF THE INVENTION

In the art of window and door components and trim, such components have historically been made of 100% natural wood. Residential windows are commonly manufactured from milled wood products that are assembled with glass to form double hung or casement units. Wood windows, while structurally sound, useful and well adapted for use in many residential installations, can deteriorate under certain circumstances. Wood windows require painting and other periodic maintenance. Wood windows are costly due to the increasing scarcity of suitable wood for construction, particularly clear wood products. As an alternative to wood, metal components are often combined with glass and fabricated into windows. Metal windows however, typically suffer from substantial energy loss during winter months.

In recent years, extruded thermoplastic materials have been used in window and door manufacture. Filled and unfilled thermoplastics have been extruded into components to form plastic windows and into seals, trim, weatherstripping, coatings, and other window construction components. Thermoplastic materials such as polyvinyl chloride (PVC) have been combined with wood members in manufacturing some windows for certain performance and cost advantages. The plastic is often colored with a coloring agent to give a wood-like appearance or to match the colors of the surrounding area. Although the colored plastic may appear somewhat wood-like, it cannot be painted or sanded or stained like real wood. For this reason, it was difficult, if not impossible, to match plastic components to natural wood surroundings. One prior art solution wrapped the plastic with a foil or laminate having a wood-like appearance. Still another solution used an epoxy to glue wood laminates onto the thermoplastic. Such laminates however are expensive and easily damaged.

It is known in the art to combine different forms of plastic with different forms of natural fiber such as wood flour, crushed shells of nuts, and other natural materials. The purpose of such previous combinations has been to enhance the physical properties and lower the cost of the product. However, such materials have not been successfully used in the form of a structural member that is a direct replacement for wood. Typical common extruded thermoplastic materials have been found not to provide thermal and structural properties similar to wood or other structural materials. Accordingly, a substantial need exists for a composite material that can be made of polymer and wood fiber with an optional, intentional recycle of a waste stream. A further need exists for a composite material that can be extruded into a shape that is a direct substitute for the equivalent milled shape in a wooden or metal structural member. This need requires a coefficient of thermal expansion that approximates wood, a material that can be extruded into reproducible stable dimensions, a high compressive strength, a low thermal transmission rate, an improved resistance to insect attack and rot while in use, and a hardness and rigidity that permits sawing, milling and fastening retention comparable to wood.

Further, companies manufacturing window and door products have become significantly sensitive to waste streams produced in the manufacture of such products. Substantial quantities of wood waste, including wood trim pieces, sawdust, wood milling by-products, recycled thermoplastic including recycled polyvinyl chloride, have caused significant expense to window manufacturers. Commonly, these materials are either burned for their heat value in electrical generation, or are shipped to qualified landfills for disposal. Such waste streams are contaminated with substantial proportions of hot melt and solvent-based adhesives, waste thermoplastic such as polyvinyl chloride, paint, preservatives, and other organic materials. A substantial need exists to find a productive, environmentally compatible process for using such waste streams for useful structural members and thus, to avoid returning the materials into the environment in an environmentally harmful way.

Therefore, the prior art teaches that conventional window and door manufacture has commonly used wood, metal and thermoplastic composites or a combination thereof. Wood windows, while structurally sound, can deteriorate under certain circumstances and require painting and other periodic maintenance. Thermoplastic, metal or thermoplastic composite windows have overcome this problem, but have created others. Metal windows typically suffer from substantial energy loss during winter months. Thermoplastic or thermoplastic composite windows, although structurally sound, have no wood on the inside which is generally preferred by the consumer. To overcome this shortcoming, manufacturers have used various alternatives. One such alternative is a combination of wood, metal or thermoplastic for the manufacture of windows which places the metal or thermoplastic on the outside of the window (thereby eliminating painting), while having the inside of the window as a wood surface, which can then be sanded, painted or stained. The thermoplastic or thermoplastic composite manufacturer often wraps the surfaces visible on the inside of the window with a foil or laminate having a wood-like appearance. Such foils however, are expensive, difficult and time consuming to apply and are easily damaged by the end-user. At best, they are only an imitation which is obvious to the end-user and cannot be sanded or stained. Another approach is to glue wood veneer on the inside of the window surfaces. This however, is difficult to apply and extremely costly.

The present invention relates to a new and improved stainable and paintable article and method of making the article which is effective in use and overcomes the foregoing difficulties and disadvantages while providing better and more advantageous overall results.

SUMMARY OF THE INVENTION

In accordance with the present invention, there is provided a process for combining cellulosic fiber and thermoplastic polymer materials, for example, wood fiber and polyvinyl chloride, coupled with the addition of a controlled amount of a release agent and an interfacial agent, within defined shear rate ranges, to form a composite material which is useful in forming structural members of controllable porosity, thereby permitting the application of stains and/or paints in a manner similar to that of natural wood.

In addition, the invention pertains to the additional step of coextruding an additional thermoplastic material (e.g., PVC) to form a unique composite of a composite plus a thermoplastic (i.e., composite of thermoplastic and wood flour plus either the same or another thermoplastic). This composite can be used to produce window and door parts that can be sanded, painted and stained on the natural fiber/thermoplastic side and have the advantage of the thermoplastic on the other side. This composite material can be used to replace parts being produced from wood, thermoplastic or metal such as aluminum and a combination thereof.

The process of this invention manufactures a composite shape comprising a mixture of a first polymer and cellulosic fiber with optionally, a second polymer such as polyvinyl chloride. In making the natural fiber/PVC composite, about 10–55% of fiber and about 90–45% polymer are combined in an extruder. The materials are blended in a high intensity mixer and extruded in a multi screw extruder. This is the preferred method, but it is recognized that blending and mixing can be done in the multi-screw extruder, thereby eliminating the high intensity mixer. The mixture is blended under melt conditions in the extruder under sufficient conditions of temperature and pressure to permit degassing (i.e., extracting water out of wood flour, and the volatiles and water out of the PVC) and simultaneously have an extrudate with a porosity that when formed, can be sanded, painted and stained.

The preferred composite material can be made from many different plastics, e.g., polyolefin, polystyrene, poly(meth)acrylic or polyester. The most preferred system uses polyvinyl chloride and wood flour. It has been found that the addition of a metal release agent is required to obtain a melt which is fracture-free. This agent may interact with an interfacial agent and the two components must be combined in defined ratios to obtain good fusion and desired porosity. Shear rate through the die openings affect porosity. The higher the shear rate, the higher the porosity. Shear rates in the range of 200–500 $\sec^{-1}$ have been found to produce the desired porosity. While a twin screw extruder is envisioned to be the best mode of practicing the invention, it is believed that a single screw extruder will also produce an acceptable product with certain screw and barrel modifications.

It is an object of this invention to provide a process by which wood flour, thermoplastic polymer, metal release agent and interfacial agent are combined to result in a composite which is of controlled porosity.

It is another object of this invention to provide an improved extruder screw design by which the above composite can be formed.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 12 is a perspective of a double hung window utilizing components manufactured in accordance with the process described in this invention;

FIG. 13 is a steel, fiberglass or wood door utilizing components manufactured in accordance with the process described in this invention;

FIG. 14 is a window component manufactured in accordance with the process described in this invention;

DETAILED DESCRIPTION OF THE INVENTION

Figure 1:
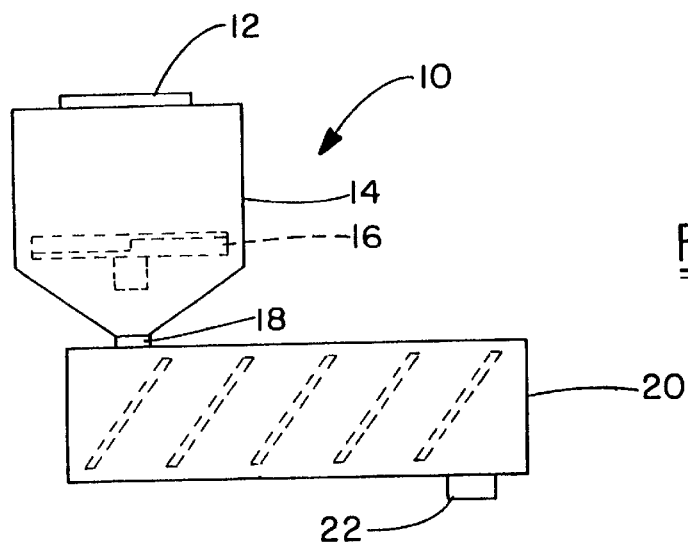
FIG. 1 is typical manufacturing setup for equipment used to compound a PVC/wood composite.

Referring now to the drawings wherein the showings are for purposes of illustrating the preferred embodiment of the invention only and not for purposes of limiting the same, the Figures show a process and a product which results from the process taught in this invention.

Figure 10:
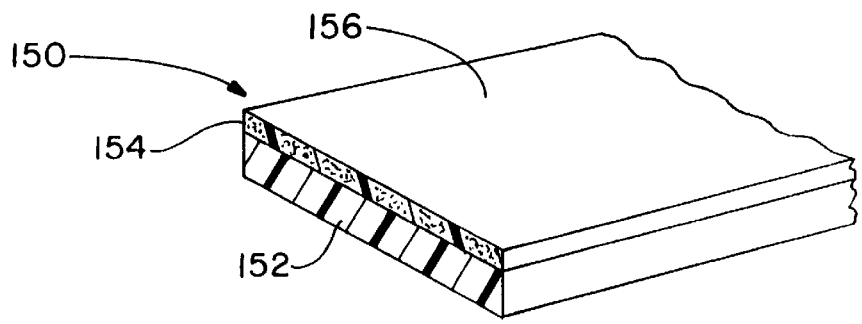
FIG. 10 is a perspective view of a piece of trim manufactured in accordance with the process described in this invention.

As shown in FIG. 10, a composite article (150) is shown having a first zone (152) and a second zone (154). In a preferred embodiment, the first zone is made entirely of plastic, most preferredly polyvinyl chloride. The second zone is a composite made of natural fiber and plastic. Once again, the most preferred plastic is polyvinyl chloride while the preferred natural fiber is wood flour. Other non-limiting examples of other thermoplastics believed to be useful in this invention would include polyolefins, polystyrenes, polyacrylics and polyesters, while other natural fibers such as crushed nut shells are also envisioned as being capable of successful incorporation into this invention.

The surface (156) of the second zone (154) is formed so that it has sufficient porosity to hold and retain conventional wood stain. The porosity of surface (156) is controlled by a mechanism which is not as yet fully understood, but is believed to involve several variables. The addition of small amounts of porosity agents, sometimes referred to as metal release agents, affects surface porosity. Increasing the amount of porosity agent in the composite decreases the porosity of the surface while decreasing the amount of porosity agent increases porosity. The preferred porosity agent is available under the commercial name Rheochem Rheolube, a paraffin and/or hydrocarbon wax blend [CAS Reg. No. 8002-74-2] having a melting point above 170° F., (preferably above 185° F.) although other porosity agents, either alone or in combination with other porosity agents or metal release agents, which function in a similar capacity are also envisioned to be within the scope of this invention. Porosity agents are added in an amount of from 0.01% to 5%, more preferably from 0.1% to 4%, and most preferably from 0.5% to 3% weight percent.

Interfacial agents also play a role in this process in aiding with the intimate blending of the dissimilar surfaces of wood flour (hydrophilic) and polymer (hydrophobic). The interfacial agent acts as a polymeric surfactant and aids in the formation of the polymer/wood flour blend through its dual functionality of having at least one portion of the moiety being hydrophilic and at least one other portion of the molecule being hydrophobic. Perhaps phrased another way, the moiety must be functionalized to the extent wherein at least one part of the molecule can bond either in a chemical or a physical sense, to at least the cellulose component of the wood flour while at least one other portion of the molecule can mix and/or compatibilize with the polymer.

Shear rate through the extrusion die opening also determines the final composite porosity and measurable porosity was only achieved by using a shear rate which was between 220–500 sec$^{-1}$. Surface (156) is also sandable with conventional sandpaper and can also be paintable. As such, the surface can be sanded, painted or stained to closely resemble genuine wood and can be matched to other interior surfaces.

Wood flour (as wood) is comprised of different wood particles which tend to vary in color. A coloring agent (e.g., TiO$_2$) is added to eliminate this variation. This is accomplished in the second zone (154), where variations and color of natural fiber may make such color emulation difficult to control within precise color schemes. Typically another coloring agent (e.g., Ferro V9156) is added to simulate wood colors.

The composite which makes up the second zone includes 10% to 55% natural fiber and 45% to 90% PVC, and a sufficient amount of both a porosity agent and an interfacial agent as defined previously to obtain a surface suitable for staining. One example of an interfacial agent is a copolymer of ethylene and acrylic acid, i.e., poly(ethylene-co-acrylic acid) (—CH$_2$CH$_2$—)$_m$[—CH$_2$CH(CO$_2$H)—]$_y$ of varying acrylic acid content. The CAS number for this family of compounds is [9010-77-9]. A second example would be an oxidized polyethylene of general formula CH$_3$(CH$_2$)$_m$(CH$_2$COOH)$_n$ of molecular weight greater than 900, [CAS 68441-17-8]. The interfacial agent is required to promote fusion in the extruder prior to venting to allow application of a vacuum to abstract moisture from the natural fiber. The interfacial agent is typically added in an amount of from 0.01% to 2%, more preferably from 0.05% to 1%, and most preferably from 0.01% to 0.5% by weight.

It is envisioned that a number of polymers are capable of acting as an interfacial agent between the cellulose surfaces in the wood flour, which have a high hydroxy content, and the polymer phase, e.g., polyvinyl chloride. Without being limited to any one theory, it is believed that the interfacial agent adsorbs on the surface of the cellulose particles and makes that surface "look" more polymer-like to the surrounding polyvinyl chloride. Hence, any polymeric compound likely to physisorb or chemisorb on cellulose is believed to provide the desired interfacial blending necessary to effectively form the desired product blend.

Various copolymers effective in this application would include copolymers of ethylene and acrylic acid, i.e. poly(ethylene-co-acrylic acid), (—CH$_2$CH$_2$—)$_x$[—CH$_2$CH(CO$_2$H)—]$_y$, commercially available with varying acrylic acid content. One of the keys to the efficacy of this group of compounds is the "-co-acrylic acid" or similar type of polymer grouping. Other promising candidates of this sort would include:

poly(ethylene-co-methacrylic acid),
(—CH$_2$CH$_2$—)$_x$[—CH$_2$C(CH$_3$)(CO$_2$H)—]$_y$;
poly(ethylene-co-methyl acrylate-co-acrylic acid),
(—CH$_2$CH$_2$—)$_x$[—CH$_2$CH(CO$_2$CH$_3$)—]$_y$[—CH$_2$CH(CO$_2$H)—]$_z$;
poly(methyl methacrylate-co-methacrylic acid),
[—CH$_2$C(CH$_3$)(CO$_2$CH$_3$)—]$_x$[—CH$_2$C(CH$_3$)(CO$_2$H)—$_y$]; and
poly(tert-butyl acrylate-co-ethyl acrylate-co-methacrylic acid),
[—CH$_2$CH[CO$_2$C(CH$_3$)$_3$]$_3$—]$_x$[—CH$_2$CH(CO$_2$C$_2$H$_5$)—]$_y$[—CH$_2$C(CH$_3$)(CO$_2$H)—]$_z$, Another characteristic believed to play a role in the efficacy of the interfacial agent is its hydroxy content. Assuming physisorption is the predominant mechanism, then compounds which are believed to aid in the composition would include:

poly(styrene-co-allyl alcohol),
[—CH$_2$CH(C$_6$H$_5$)—]$_x$[—CH$_2$CH(CH$_2$OH)—]$_y$; and
poly(vinyl alcohol-co-ethylene),
(—CH$_2$CH$_2$—)$_x$[—CH$_2$CH(OH)—]$_y$ As will be discussed later in this application, when chemisorption is at least one of the operative modes of this invention regarding the interfacial agent and the cellulose, then any carboxylic acid group containing polymer will have at least some degree of efficacy in this system. Additionally, ester bonds can be formed from amides, acrylates, acyl haldes, nitriles and acid anhydrides reacting with hydroxyl groups. Additional representative polymers would include:

poly(vinyl chloride), carboxylated,
poly(vinyl chloride-co-vinyl acetate-co-maleic anhydride), and

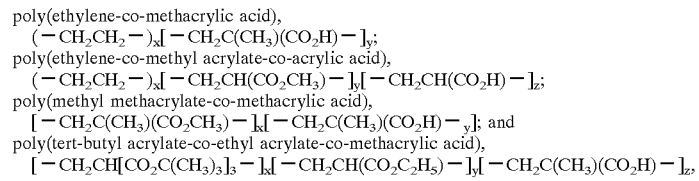

various -co-maleic acid or -graft-maleic acid polymers, of which there are many.

Amides will react with alcohols under acidic conditions to produce an ester and an ammonium salt, rather than water as in the case with carboxylic acids, of which representative examples would include:

polyacrylamide,
[—CH$_2$CH(CONH$_2$)—]$_n$; and
poly(acrylamide-co-acrylic acid),
[—CH$_2$CH(CONH$_2$)—]$_x$[CH$_2$CH(CO$_2$H)—]$_y$, although the hygroscopic qualities of these polymers somewhat diminish their effectiveness in this application.

Another chemistry which is applicable is that of the acrylates, which are a subset of esters. It would be possible to form an ester bond with an alcohol producing another alcohol in a transesterification reaction. For example, a methacrylate containing polymer could react with the surface hydroxyl to form the surface ester bond and methanol. Representative examples would include:

poly(methyl methacrylate),
  [−CH$_2$C(CH$_3$)(CO$_2$CH$_3$)−]$_n$;
poly(ethyl methacrylate),
poly(ethylene-co-ethyl acrylate),
  (−CH$_2$CH$_2$−)$_x$[−CH$_2$CH(CO$_2$C$_2$H$_5$)−]$_y$; and
poly(butyl acrylate),
  [−(CH$_2$CH$_2$)CO$_2$(CH$_2$)$_3$CH$_2$−]$_n$.

It is also known that acyl halides can react with an hydroxyl group to yield the ester bond and HCl. Another reaction chemistry would include that of a nitrile with a hydroxyl group under acidic conditions to yield the ester bond and an ammonium salt. Representative examples would include:

polyacrylonitrile,
  [−CH$_2$CH(CN)−]$_n$; and
poly(acrylonitrile-co-butadiene),
  [−CH$_2$CH(CN)−]$_x$[−CH$_2$CH=CHCH$_2$−]$_y$, particularly when the above poly(acrylonitrile-co-butadiene) is functionalized via amine termination or carboxylation.

Another reaction which is possible is via an acid anhydride which reacts with a hydroxyl group to give the ester bond and an ester. A representative example would include:

poly(ethylene-co-ethyl acrylate-co-maleic anhydride).

Another family of block copolymers which are believed to be effective in this composition would be those formed with polyacrylic or polymethyacrylic acid, e.g., polystyrene di-block copolymers such as polystyrene-b-polyacrylic acid and polystyrene-b-polymethacrylic acid. Other candidates include block copolymers with polyvinyl alcohol or polyoxyethylene.

Once again, without being limited to any one theory of operation, it is conceivable that any hydroxyl, hydroxy or acid functionalized low to medium molecular weight polymers may serve as compatibilizers in this system, e.g., hydroxyl functionalized polybutadiene [CAS 69102-90-5], HO(−CH$_2$CH=CHCH$_2$−)$_n$OH.
Other compounds which may act similarly would include
poly(vinyl chloride-co-vinyl acetate),
  [−CH$_2$CH(Cl)−]$_x$[−CH$_2$CH(O$_2$CCH$_3$)−]$_y$;
poly(vinyl chloride-co-vinyl acetate-co-2-hydroxypropyl acrylate),
  [−CH$_2$CH(Cl)−]$_x$[CH$_2$CH(O$_2$CCH$_3$)−]$_y$[−CH$_2$CH[CO$_2$CH$_2$CH(OH)CH$_3$]−]$_z$; and
poly(vinyl chloride-co-vinyl acetate-co-maleic acid),
  [−CH$_2$CH(Cl)−]$_x$[CH$_2$CH(O$_2$CCH$_3$)−]$_y$[−CH(CO$_2$H)CH(CO$_2$H)−]$_z$.

As shown in FIG. 1, a typical manufacturing mixing setup is shown in order to produce the plastic/wood composite. In an illustrative example, the following materials as shown in Table I would be added into mixing apparatus (10) through inlet (12).

TABLE I

| Component | Quantity (lbs.) |
|---|---|
| Wood Flour (American Wood Flour) | 50.0 |
| Porosity Agent (Rheochem Rheolube 185) | 2.5 |
| Interfacial Agent (Variable) | 0.3 |
| Pigment (Dupont R960 TiO$_2$) | 5.0 |

TABLE I-continued

| Component | Quantity (lbs.) |
|---|---|
| Pigment (Ferro V9156) | 1.5 |
| PVC (Georgia Gulf 3304/WH194) | 116.0 |

The preferred plastic is polyvinyl chloride or PVC, although it is envisioned that other thermoplastics would also be operative in this process making appropriate temperature modifications due to polymeric base property differences. Other envisioned thermoplastics would include polyolefins, polystyrenes, polyacrylics and polyesters. The preferred natural fiber, wood flour, is manufactured in hardwood and pine grades, or in any natural fiber containing cellulose, and in various particle size distributions. Wile the mesh sizes from 20 mesh (850μ) to 140 mesh (106μ), the preferred wood fiber is 80 mesh (180μ) hardwood grade.

The high intensity mixer (10) is started using mixing blade (16) in hopper (14) after the ingredients are added via inlet (12). Mixing continues until the temperature of the mixture reaches 210° F. This temperature is higher than the melting point of the porosity aid used (Rheolube), but lower than its decomposition temperature. As the porosity aid is melted, it adheres to the wood and other ingredients making a better homogeneous mixture. Upon reaching the final mixing temperature, the high intensity mixer (10) is stopped and its contents discharged via outlet (18) into water jacketed ribbon blender (20) which reduces the mixture temperature to a lower constant temperature, thereby reducing the heat history of the composite material. In a preferred embodiment, this reduced temperature is room temperature. Variations in material temperature will cause extrusion throughput changes, which is highly undesirable, as would be the case when the material is used immediately after blending. Since generally some period of time passes prior to the utilization of the material, the temperature is reduced to room temperature for convenience, and to minimize degradation.

Figure 2:
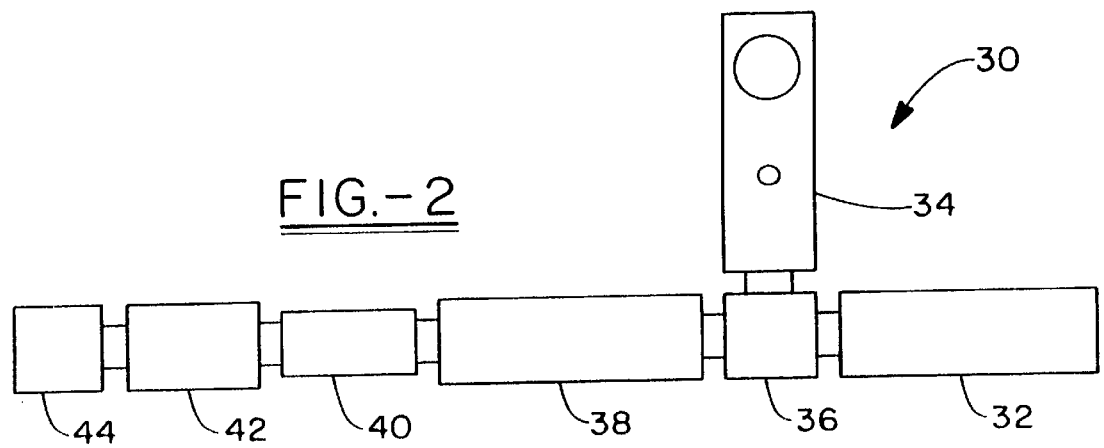
FIG. 2 is a manufacturing setup showing two extruders and a dual extrusion head, with subsequent material processing equipment.

In FIG. 2, a typical manufacturing operation (30) is shown schematically. A first extruder (32), into which the mixed polymer/fiber has been added of FIG. 1, extrudes the natural fiber/plastic compound through a dual extrusion head (36). A second extruder (34) which is necessary to make a co-laminated extruded product, but optional to simply make a natural fiber/plastic compound, extrudes a solid polymer (e.g., PVC), also through the dual extrusion head. The preferred manufacturing operation utilizes a conical twin extruder because it has good PVC processing characteristics, can homogenize the PVC/wood flour mixture and all other ingredients. In addition, it has venting capability to extract water from the wood flour and the other components. Wood flour can have between 1–10% water initially present, (more typically 3–6%), and this amount is reduced down to less than about ½%. After the composite has been extruded through the dual extrusion head (36), it passes to a vacuum calibration device (38), described more fully with reference to FIGS. 7–8, an embossing station (40), described more fully with reference to FIG. 9, a puller (42) which continues to pull the extruded composite through the process apparatii and a cutter (44) which cuts the composite to desired lengths. While separate mixing and extruding equipment has been described, for some applications, it is possible that the step of mixing can occur in the extruder. It is of course appreciated that the designation of first and second extruders is for purposes of convenience only, and that material fed into one extruder could just as easily be fed into the other extruder after having incorporated the modifications to the screw design as discussed below in addition to the appropriate temperatures as also discussed.

Figure 3:
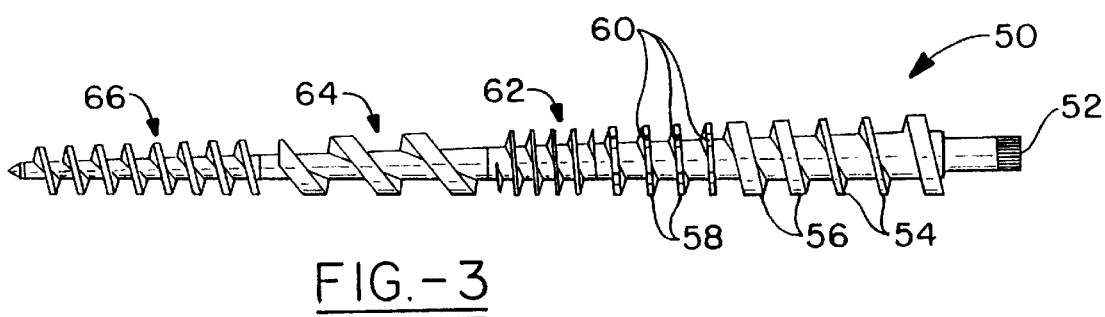
FIG. 3 is a side view of an extruder screw as would be used in FIG. 2 for performing the process of the present invention.
Figure 3A:
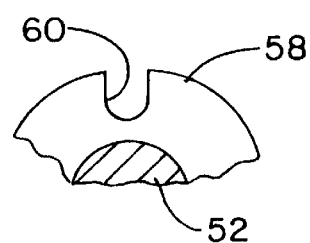
FIG. 3a is an expanded view of a notch configuration in the pre-compression section of the extruder screw as shown in FIG. 3.

As shown in FIG. 3, one customized screw (50) from the extruder (32) is shown. Because of the high wood flour content in the compound, a set of high shear screws are utilized to enhance fusion before the vent. To further enhance the fusion process between the wood flour and polymer, the feed and shear sections prior to the vent have been modified to increase the feed (wood flour greatly decreases the bulk density) and increase the shear action of the screws. A screw shaft (52) is divided into a plurality of sections, each designed to maximize the performance of one aspect of this process. In the feed section, screws (56) of width (w), e.g., 0.560" are reduced to screws (54) having a more narrow width (w'), e.g., 0.236" to permit more feed into the extruder and minimize the wear and tear on the screw flights. In the pre-compression section, a plurality of notches (60), (26 notches as used in a specific embodiment of this invention) are cut into the screws (58) to increase the amount of shear to which the composite is exposed, since a homogeneous melt has yet to be made, leading to compression section (62) where the fusion is maximized. The pre-compression screws notches are ~1" diameter and the notches are ~0.17" up from the root diameter of the screw with ~6 notches per flight as shown in FIG. 3a. Vent flight (64) relieves the pressure generated by the fusion process and water vapor release leading to metering section (66) which leads to extrusion die (36). Insufficient vacuum leads to a product which easily goes through the die, but which has no mechanical strength. The vacuum used typically is about 0.6 bar, but can range from 0.2 to 1 bar.

As indicated previously, wood flour reduces the bulk density of the composite formulation. With the preferred 30–40% wood flour content, extrusion in a multi-screw extruder, with conventional screws, such as used in PVC pipe extrusion, was simply not possible. The material was not sufficiently melted to allow abstracting water and volatiles. Altering the screws as described previously, to obtain more volume in the metering zone and more shear in the compression section, permitted controlled venting. It has also be determined that the temperature profile of the extruder is important in developing the characteristics associated with the composite of this invention. It has been found that a high initial temperature in the input zone of the extruder is important, while reducing the temperature through the extruder zones as the material passes from the input zone through interior zones to the die zones aids in melting the material prior to the venting port, and also aids in forming a melt that is homogeneous and has porosity after it exits the die.

In a preferred embodiment of this invention, the temperature profile of the extruder comprises a high input temperature, a step-wise reduction in temperature as the material passes from the input zone through the interior zones of the extruder. The temperature of the coextrusion die is greater than the interior zone, but less than the input (feed) zone. Even using the above mentioned steps, melting prior to the vent was difficult. The addition of an interfacial agent greatly enhances fusion prior to the vent, but also has an adverse effect on the porosity of the melt.

The preferred extruder for performing the present invention is a Krauss-Maffei KMD 60 multi-screw extruder. Other extruders such as Cincinnati Milacron (CM-55) could also be utilized in the invention. The KMD 60 is preferred in that it has a positive displacement pump for the controlled transport of material through a die. The extruders used in this invention will have as major components, a barrel and preferably two screws, to transport, mix and compress the material, a heating and cooling system to control the heat needed for processing, a drive train to power the screws, and a control station for controlling the operation of the extruder, including instruments to monitor the process and indicate possible problems.

Figure 4:
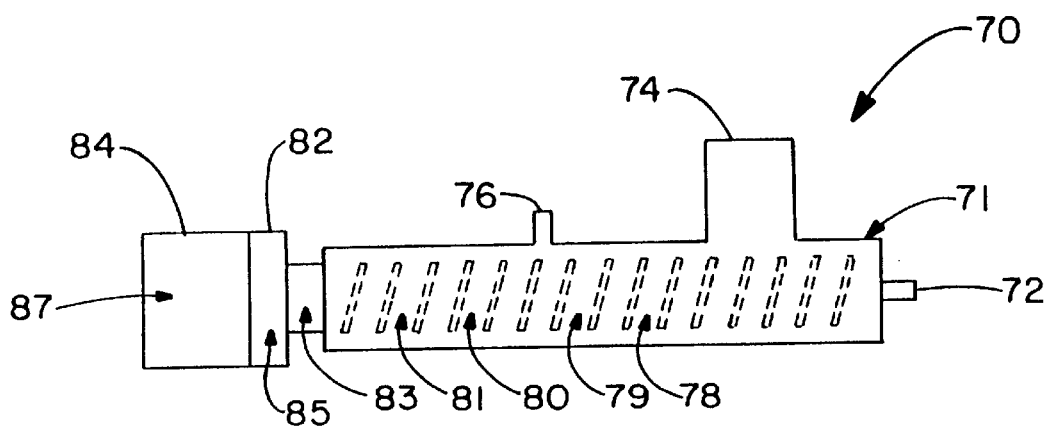
FIG. 4 is a side view of an extruder with various identified temperature zones.

The barrel will be of a meshing, dual conical tape bore. The combination of barrel taper and screw flight provides proper compression of the composite material. As shown in FIG. 4, the barrel is manufactured in one piece and has four operational zones. The larger outside diameter of the screws in the barrel intake area, zone 1 (78), allows for good intake of material and provides a large surface area for heat transfer to the material. Between zones two (79) and three (80), is a vent (76) to allow moisture and other gases to escape from the barrel (71). The fourth zone (81) is a metering zone where the material is compressed and metered out to a die (84). Between die (84) and extruder barrel (71) is an adapter (82) having zones 5 (83) and 6 (85).

The screws each have a hollow core through which heat transfer liquid is circulated. This allows the transfer of unwanted frictional heat from zone 4 (81) back toward zone 1 (78). The four heat zones on barrel (71) are independently controlled by electric heat bands and heat exchangers for accurate stabilization of operation temperatures. Likewise, zones 5 (83) and 6 (85) on adapter (82) and zone 7 (87) on die (84) are independently controlled by heater bands and heat exchangers for accurate temperature control. The temperature of the heat transfer liquid in the screws is also independently controlled. The preferred screws are Krauss-Maffei Pipe screws (high shear and high compression), and the preferred die is a custom-built co-extrusion die.

Heat is applied to the four barrel zones by the electric heat bands. Heat is removed from barrel (71) by circulating oil through coils wound around the barrels at zones 2 (79), 3 (80) and 4 (81). The oil is circulated by a pump unit through a heat exchanger located in the base of the extruder. The barrel cooling system is equipped with flow indicators for a visual check of the cooling performance in each cooling zone. Screw core cooling/heating is accomplished with an independent temperature control unit.

The drive train begins with an infinitely variable speed, constant torque drive motor coupled to a speed reducer. From the speed reducer, the drive train evolves into a two-shaft distribution gear drive. Since the drive shafts are on the center lines of their corresponding tapered screws, it is possible to use large gears for torque transfer and large bearings to take up the axial force (back pressure) generated in the operation of the extruder. In order to achieve consistent quality of product, the speed and motor load of the drive train and the axial load of the thrust bearings are measured. The temperature within extruder (70) is elevated to have a profile as shown in Table II.

TABLE II

Twin Screw Extruder Temperature Profile

| Zone | Temp (°F.) Extruder #1 | Temp (°F.) Extruder #2 |
|---|---|---|
| Screw oil | 395 | 240 |
| 2 Zones before vent | 395 | 360 |
| 2 Zones after vent | 335 | 290 |
| Adapter | 375 | 375 |
| Extrusion die | 390 | 390 |

The temperature profiles of screw oil temperature (72), temperature two zones before (78) the vent (76), two zones after (80) the vent, the adapter (82) and extrusion die (84) are shown.

Figure 5:
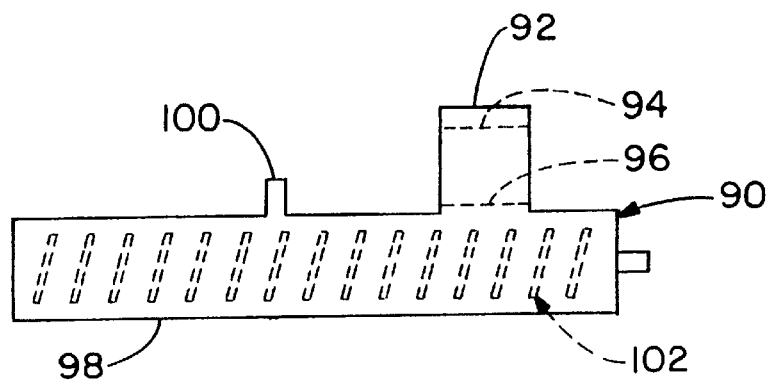
FIG. 5 is a side view of an extruder showing the proper feeding level within the feed tube.

As shown in FIG. 5, in most extruder applications, the common practice is to flood feed (94) the extruder (90). This should be avoided. The high wood flour content with 5–6% moisture, gives off steam when it comes into contact with the extrusion screws (102). It is difficult for the steam to escape when the feed throat (92) is flood fed (94) leading to clumping of material and output variations. A level that barely covers the screws (96) is ideal.

Figure 6:
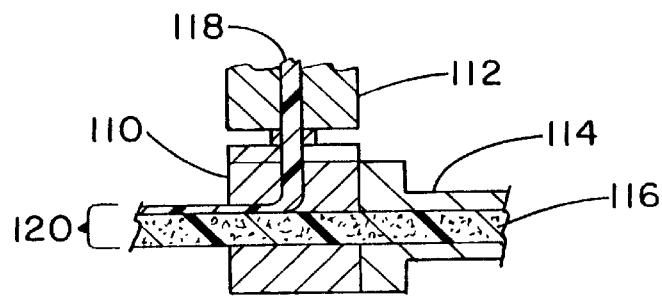
FIG. 6 is a side view shown in cross-section of the co-extrusion die.

When the extrudate exits the adapter (82) of FIG. 4, it enters into the integrally attached coextrusion head (110) as shown in FIG. 6 wherein PVC extrudate (118) from the second extruder (112) is coextruded onto natural fiber/PVC extrudate (116) from the first extruder (114) to form the coextruded composite (120). A typical temperature profile of the second extruder (112) would be essentially as follows (Table III) when it is a single screw extruder, and would appear as the second column in Table II when a double screw extruder. Broader ranges for the temperatures would encompass from 330°–425° F. before the vent, from 280°–390° F. after the vent, from 300°–425° F. adjacent to the die, from 350°–425° F. at the die, and a screw oil temperature from 330°–425° F.

TABLE III

| Zone | Temperature (°F.) |
|---|---|
| Rear | 340 |
| Adjacent 2 Zones | 330 |
| Adapter | 310 |

Figure 7:
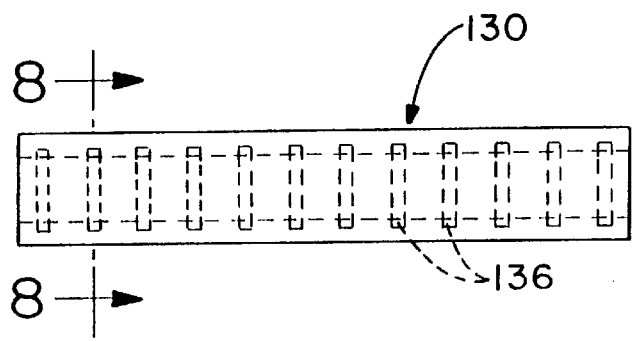
FIG. 7 is a side view a vacuum calibration device.
Figure 8:
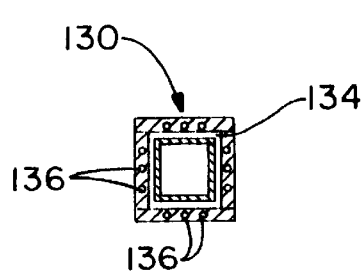
FIG. 8 is a cross-sectional view of the vacuum calibration device shown in FIG. 7 along line 8—8.

As shown in FIGS. 7 and 8, the composite extrudate (120) then passes through a vacuum calibration device (130) having vacuum grooves (134). The internal configuration which touches the composite extrudate has the shape of the final shape of the desired profile. A vacuum is applied to the composite shape to make it conform to the calibration configuration and continuously mold and cool the product. The calibration device is water cooled using water cooling channels (136) so that the composite extrudate cools while being formed.

Figure 9:
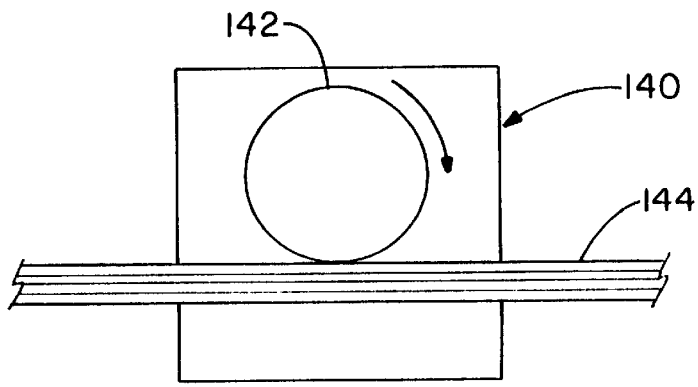
FIG. 9 is a side view of an embossing station.

The composite shape is now completely cooled and enters the embossing station (140) as shown in FIG. 9. This is a 6" diameter hardened and chrome plated wheel (142) which is embossed with typically either a pine or oak pattern (144). It is heated to 350°–390° F. and sufficient pressure is applied to obtain a wood pattern while it is being rotated from the composite shape being pulled through, although in some applications, the embossing station may be motor-driven. Depending on the number of surfaces which are to be embossed, an embossing roll is required for each surface.

While the embosser is shown subsequent to the calibration device, it is also envisioned that in some applications, the embossing station (140) may be positioned subsequent to the extrusion die, followed by sizing calibration operations. In this instance, the material will still be hot and will require that the embossing station be motor driven and cooled.

The finished composite shape then passes through a puller which acts as the pulling force to pull the composite through the calibration device and embossing stations. The composite shape is then pushed through a saw which travels with the shape as it is being sawn to length.

The best mode for carrying out the invention will now be described for the purposes of illustrating the best mode known to the applicant at the time. The examples are illustrative only and not meant to limit the invention, as measured by the scope and spirit of the claims.

EXAMPLE #1

A composite of PVC/wood flour/porosity agent/interfacial agent is made in accordance with the conditions discussed above by combining the reactants in the following amounts:

TABLE I

| Component | Quantity (lbs.) |
|---|---|
| Wood Flour (American Wood Flour) | 50.0 |
| Porosity Agent (Rheochem Rheolube 185) | 2.5 |
| Interfacial Agent (as identified below) | 0.3 |
| Pigment (Dupont R960 $TiO_2$) | 5.0 |
| Pigment (Ferro V9156) | 1.5 |
| PVC (Georgia Gulf 3304/WH194) | 116.0 |

EXAMPLE #2

A composite of PVC/wood flour/porosity agent/interfacial agent is made in accordance with the conditions and quantities of reactants as discussed above in Example #1 with the substitution of poly(ethylene-co-acrylic acid), $(-CH_2CH_2-)_x[-CH_2CH(CO_2H)-]_y$, [CAS 9010-77-9] as the interfacial agent and wherein the values of x and y are adjusted to control the degree of blend compatibility desired with the final physical characteristics of the composite.

EXAMPLE #3

A composite of PVC/wood flour/porosity agent/interfacial agent is made in accordance with the conditions and quantities of reactants as discussed above in Example #1 with the substitution of poly(ethylene-co-methacrylic acid), $(-CH_2CH_2-)_x[-CH_2C(CH_3)(CO_2H)-]_y$ [CAS 25053-53-6] as the interfacial agent and wherein the values of x and y are adjusted to control the degree of blend compatibility desired with the final physical characteristics of the composite.

EXAMPLE #4

A composite of PVC/wood flour/porosity agent/interfacial agent is made in accordance with the conditions and quantities of reactants as discussed above in Example #1 with the substitution of poly(ethylene-co-methyl acrylate-co-acrylic acid), $(-CH_2CH_2-)_x[-CH_2CH(CO_2CH_3)-]_y[-CH_2CH(CO_2H)-]_z$ [CAS 41525-41-1] as the interfacial agent and wherein the values of x, y and z are adjusted to control the degree of blend compatibility desired with the final physical characteristics of the composite.

EXAMPLE #5

A composite of PVC/wood flour/porosity agent/interfacial agent is made in accordance with the conditions and quantities of reactants as discussed above in Example #1 with the substitution of poly(methyl methacrylate-co-methacrylic acid), [—$CH_2C(CH_3)(CO_2CH_3)$—]$_x$[—$CH_2C(CH_3)(CO_2H)$—]$_y$ as the interfacial agent and wherein the values of x and y are adjusted to control the degree of blend compatibility desired with the final physical characteristics of the composite.

EXAMPLE #6

A composite of PVC/wood flour/porosity agent/interfacial agent is made in accordance with the conditions and quantities of reactants as discussed above in Example #1 with the substitution of poly(tert-buty acrylate-co-ethyl acrylate-co-methacrylic acid), [—$CH_2CH[CO_2C(CH_3)_3]_3$—]$_x$[—$CH_2CH(CO_2C_2H_5)$—]$_y$[—$CH_2C(CH_3)(CO_2H)$—]$_z$ as the interfacial agent and wherein the values of x, y and z are adjusted to control the degree of blend compatibility desired with the final physical characteristics of the composite.

EXAMPLE #7

A composite of PVC/wood flour/porosity agent/interfacial agent is made in accordance with the conditions and quantities of reactants as discussed above in Example #1 with the substitution of poly(styrene-co-allyl alcohol), [—$CH_2CH(C_6H_5)$—]$_x$[—$CH_2CH(CH_2OH)$—]$_y$ [CAS 25119-62-4] as the interfacial agent and wherein the values of x and y are adjusted to control the degree of blend compatibility desired with the final physical characteristics of the composite.

EXAMPLE #8

A composite of PVC/wood flour/porosity agent/interfacial agent is made in accordance with the conditions and quantities of reactants as discussed above in Example #1 with the substitution of poly(vinyl alcohol-co-ethylene), (—$CH_2CH_2$—)$_x$[—$CH_2CH(OH)$—]$_y$ [CAS 25067-34-9] as the interfacial agent and wherein the values of x and y are adjusted to control the degree of blend compatibility desired with the final physical characteristics of the composite.

EXAMPLE #9

A composite of PVC/wood flour/porosity agent/interfacial agent is made in accordance with the conditions and quantities of reactants as discussed above in Example #1 with the substitution of poly(vinyl chloride), carboxylated, as the interfacial agent.

EXAMPLE #10

A composite of PVC/wood flour/porosity agent/interfacial agent is made in accordance with the conditions and quantities of reactants as discussed above in Example #1 with the substitution of poly(vinyl chloride-co-vinyl acetate-co-maleic anhydride) [—$CH_2CH(Cl)$—]$_x$[$CH_2CH(O_2CCH_3)$—]$_y$[—$CH(CO_2H)CH(CO_2H)$—]$_z$ [CAS 9005-09-8] as the interfacial agent and wherein the values of x, y and z are adjusted to control the degree of blend compatibility desired with the final physical characteristics of the composite.

EXAMPLE #11

A composite of PVC/wood flour/porosity agent/interfacial agent is made in accordance with the conditions and quantities of reactants as discussed above in Example #1 with the substitution of polyacrylamide, [—$CH_2CH(CONH_2)$—]$_n$ [CAS 9003-05-8] as the interfacial agent and wherein the value of n is adjusted to control the degree of blend compatibility desired with the final physical characteristics of the composite.

EXAMPLE #12

A composite of PVC/wood flour/porosity agent/interfacial agent is made in accordance with the conditions and quantities of reactants as discussed above in Example #1 with the substitution of poly(acrylamide-co-acrylic acid), [—$CH_2CH(CONH_2)$—]$_x$[$CH_2CH(CO_2H)$—]$_y$ [CAS 9003-06-9] as the interfacial agent and wherein the values of x and y are adjusted to control the degree of blend compatibility desired with the final physical characteristics of the composite.

EXAMPLE #13

A composite of PVC/wood flour/porosity agent/interfacial agent is made in accordance with the conditions and quantities of reactants as discussed above in Example #1 with the substitution of poly(methyl methacrylate), [—$CH_2C(CH_3)(CO_2CH_3)$—]$_n$ [CAS 9001-14-7] as the interfacial agent and wherein the value of n is adjusted to control the degree of blend compatibility desired with the final physical characteristics of the composite.

EXAMPLE #14

A composite of PVC/wood flour/porosity agent/interfacial agent is made in accordance with the conditions and quantities of reactants as discussed above in Example #1 with the substitution of poly(ethylene-co-ethyl acrylate), (—$CH_2CH_2$—)$_x$[—$CH_2CH(CO_2C_2H_5)$—]$_y$ [CAS 9010-86-0] as the interfacial agent and wherein the values of x and y are adjusted to control the degree of blend compatibility desired with the final physical characteristics of the composite.

EXAMPLE #15

A composite of PVC/wood flour/porosity agent/interfacial agent is made in accordance with the conditions and quantities of reactants as discussed above in Example #1 with the substitution of poly(butyl acrylate), [—$(CH_2CH_2)CO_2(CH_2)_3 CH_2$—]$_n$ [CAS 9003-49-0] as the interfacial agent and wherein the value of n is adjusted to control the degree of blend compatibility desired with the final physical characteristics of the composite.

EXAMPLE #16

A composite of PVC/wood flour/porosity agent/interfacial agent is made in accordance with the conditions and quantities of reactants as discussed above in Example #1 with the substitution of polyacrylonitrile, [—$CH_2CH(CN)$—]$_n$ [CAS 25014-41-9] as the interfacial agent and wherein the value of n is adjusted to control the degree of blend compatibility desired with the final physical characteristics of the composite.

EXAMPLE #17

A composite of PVC/wood flour/porosity agent/interfacial agent is made in accordance with the conditions and quantities of reactants as discussed above in Example #1 with the substitution of poly(acrylonitrile-co-butadiene), [—$CH_2CH(CN)$—]$_x$[—$CH_2CH=CHCH_2$—]$_y$ [CAS 9003-18-3] as the interfacial agent and wherein the values of x and y are adjusted to control the degree of blend compatibility desired with the final physical characteristics of the composite.

EXAMPLE #18

A composite of PVC/wood flour/porosity agent/interfacial agent is made in accordance with the conditions and quantities of reactants as discussed above in Example #1 with the substitution of poly(ethylene-co-ethyl acrylate-co-maleic anhydride) [CAS 41171-14-6] as the interfacial agent and wherein the value for the molecular weight is adjusted to control the degree of blend compatibility desired with the final physical characteristics of the composite.

EXAMPLE #19

A composite of PVC/wood flour/porosity agent/interfacial agent is made in accordance with the conditions and quantities of reactants as discussed above in Example #1 with the substitution of polystyrene-b-polyacrylic acid as the interfacial agent and wherein the relative amounts of the polystyrene block and the polyacrylic block are adjusted to control the degree of blend compatibility desired with the final physical characteristics of the composite.

EXAMPLE #20

A composite of PVC/wood flour/porosity agent/interfacial agent is made in accordance with the conditions and quantities of reactants as discussed above in Example #1 with the substitution of polystyrene-b-polymethacrylic acid as the interfacial agent and wherein the relative amounts of the polystyrene block and the polymethacrylic block are adjusted to control the degree of blend compatibility desired with the final physical characteristics of the composite.

EXAMPLE #21

A composite of PVC/wood flour/porosity agent/interfacial agent is made in accordance with the conditions and quantities of reactants as discussed above in Example #1 with the substitution of polystyrene-b-polyvinyl alcohol as the interfacial agent and wherein the relative amounts of the polystyrene block and the polyvinyl alcohol block are adjusted to control the degree of blend compatibility desired with the final physical characteristics of the composite.

EXAMPLE #22

A composite of PVC/wood flour/porosity agent/interfacial agent is made in accordance with the conditions and quantities of reactants as discussed above in Example #1 with the substitution of polystyrene-b-polyoxyethylene as the interfacial agent and wherein the relative amounts of the polystyrene block and the polyoxyethylene block are adjusted to control the degree of blend compatibility desired with the final physical characteristics of the composite.

EXAMPLE #23

A composite of PVC/wood flour/porosity agent/interfacial agent is made in accordance with the conditions and quantities of reactants as discussed above in Example #1 with the substitution of hydroxyl functionalized polybutadiene, $HO(-CH_2CH=CHCH_2-)_nOH$ [CAS 69102-90-5] as the interfacial agent and wherein the value of n is adjusted to control the degree of blend compatibility desired with the final physical characteristics of the composite.

EXAMPLE #24

A composite of PVC/wood flour/porosity agent/interfacial agent is made in accordance with the conditions and quantities of reactants as discussed above in Example #1 with the substitution of poly(vinyl chloride-co-vinyl acetate), $[-CH_2CH(Cl)-]_x[-CH_2CH(O_2CCH_3)-]_y$ [CAS 9003-22-9] as the interfacial agent and wherein the values of x and y are adjusted to control the degree of blend compatibility desired with the final physical characteristics of the composite.

EXAMPLE #25

A composite of PVC/wood flour/porosity agent/interfacial agent is made in accordance with the conditions and quantities of reactants as discussed above in Example #1 with the substitution of poly(vinyl chloride-co-vinyl acetate-co-2-hydroxypropyl acrylate), $[-CH_2CH(Cl)-]_x[CH_2CH(O_2CCH_3)-]_y[-CH_2CH[CO_2CH_2CH(OH)CH_3]-]_z$ [CAS 41618-91-1] as the interfacial agent and wherein the values of x, y and z are adjusted to control the degree of blend compatibility desired with the final physical characteristics of the composite.

EXAMPLE #26

A composite of PVC/wood flour/porosity agent/interfacial agent is made in accordance with the conditions and quantities of reactants as discussed above in Example #1 with the substitution of poly(vinyl chloride-co-vinyl acetate-co-maleic acid), $[-CH_2CH(Cl)-]_x[CH_2CH(O_2CCH_3)-]_y[-CH(CO_2H)CH(CO_2H)-]_z$ [CAS 9005-09-8] as the interfacial agent and wherein the values of x, y and z are adjusted to control the degree of blend compatibility desired with the final physical characteristics of the composite.

Figure 11:
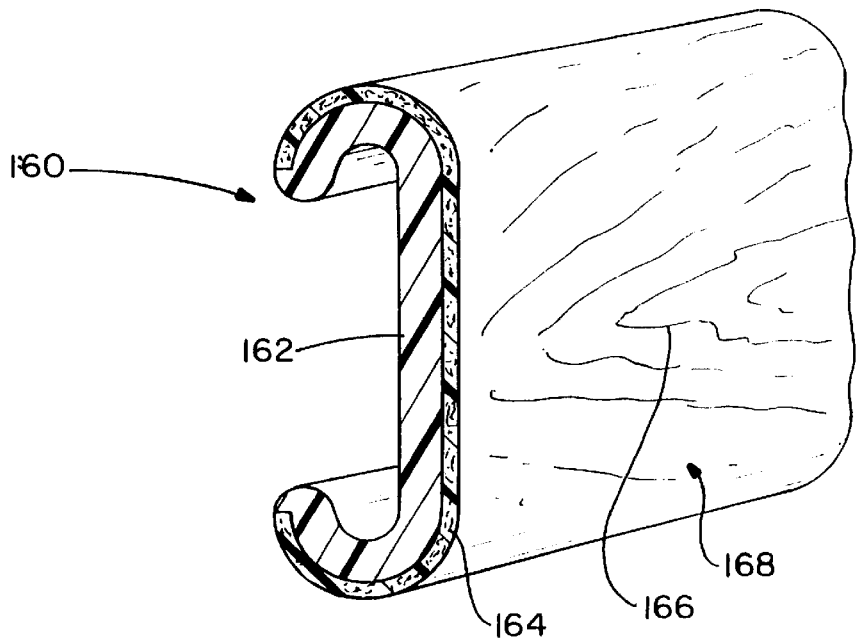
FIG. 11 is a perspective view of a handle rail manufactured in accordance with the process described in this invention.

When the above process is followed, various products such as trim (FIG. 10), handle rails (FIG. 11), double hung windows (FIG. 12), doors (FIG. 13), and window components (FIG. 14) can be produced. As discussed previously with reference to FIG. 10, the handle rail shown in FIG. 11 shows the coextruded composite (160) wherein the outer surface (168) represents the composite natural fiber/PVC component (164) and the inner surface is the PVC segment (162). The outer surface (168) may be embossed with a wood grain pattern (166) which can then be stained or painted.

The double hung windows shown in FIG. 12, also shows the coextruded construction (170) wherein the inner composite (174) is the natural fiber/plastic component and the outer section (172) is the PVC segment. In this arrangement, the inner composite (174) can be stained and/or painted to match interior room decor. Due to temperature variations in windows, with very cold weather on one side of the window and warm temperatures on the interior side, dimensional integrity of plastic window components can be a problem. Since natural fibers have better thermal stability when compared with many plastics, the addition of natural fiber can improve performance. Prior art vinyl windows would necessarily have plastic components visible from the interior side of the window. These interior components could only roughly approximate the appearance of natural wood. Some previous attempts to rectify this included wrapping such components with foil which simulated wood grain. However, this represented an expensive solution and the foil was often too fragile to retain its appearance for long period of time under heavy use.

With reference to FIG. 13, another common application of the invention is shown. A door (180) is primarily made of wood, metal, or fiberglass. Some designs feature window glass (184) surrounded by trim (182). This trim is a good application of the composite article shown in FIG. 10.

In one specialized utilization of this invention shown in FIG. 14, a piece of weather stripping (198) is affixed along a longitudinal edge (196) to form an insulation sealed coextruded product (190) having a natural fiber/PVC component (194) and a PVC component (192). It is recognized that when the product manufactured is as shown in FIG. 13, an additional extruder is necessary, and the co-extrusion head discussed previously, will be modified to allow an additional melt stream which will form the weatherseal (i.e., a tri-extrusion head). When using flexible vinyl as the additional melt stream, an effective bond is found to be made between the composite material and the weatherseal. While flexible vinyl is typically preferred for many window and door applications, there is no need to limit the invention to such and other materials that bond to rigid PVC and/or natural fiber/PVC composites would also work. While the processing conditions are generally known throughout the industry for extrusions involving flexible vinyl, a typical set of temperatures in the extruder/head would be approximately 270° F. for the rear zone and zone 2 as defined previously, and 320° F. for zone 3 and the adapter.

The amount of stain/porosity absorption the final extruded profile will have is dependent on the porosity of the external surface. The greater the porosity, the greater the absorption. Porosity is controlled by adding a small amount of additional porosity agent to the mixture (commercially available PVC having some metal release agent or porosity agent already added) and interfacial agent. The preferred porosity agent is Rheochem Rheolube 185. It has been found that this release agent also deters fusion in the feed, pre-compression and compression portion of the extruder. In the extruder, venting (extracting moisture via vacuum from the wood) becomes very difficult since the wood/PVC have not been sufficiently melted to form a homogeneous melt in the vent section of the extruder. In this case, water, PVC and some wood flour can be extracted into the vent section. To overcome this problem, the high compression/high shear standard pipe screws were modified by narrowing the two flight widths in the feed section to allow more feed. Also, notches were added in the pre-compression section of the screws to obtain more shear. While this improved the process, insufficient fusion was still noted at the vent and an interfacial agent was needed to be added to the mixture to obtain melt which is suitable for venting. Another factor that influences porosity is shear rate through the die opening (straight land length), shear rates (based on PVC only) between 220°–500 sec$^{-1}$ showed good porosity with the preferred mixture.

Figure 15:
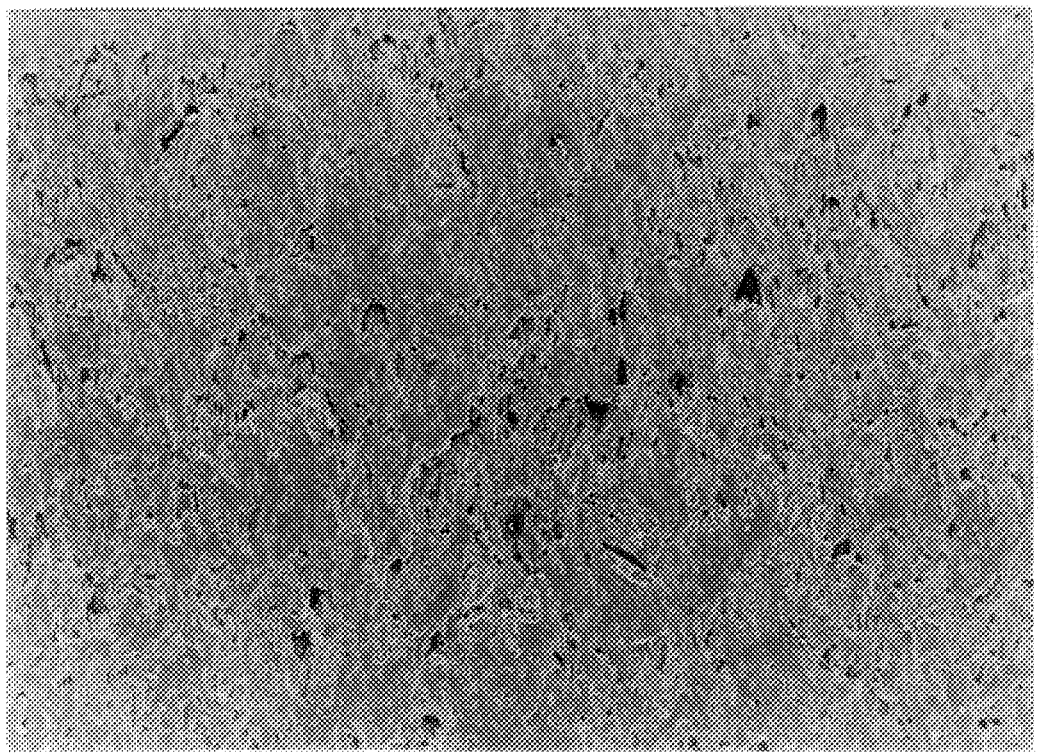
FIG. 15 is a scanning electron micrograph of a natural fiber/PVC composite taken at 15 KV at 20× magnification.
Figure 16:
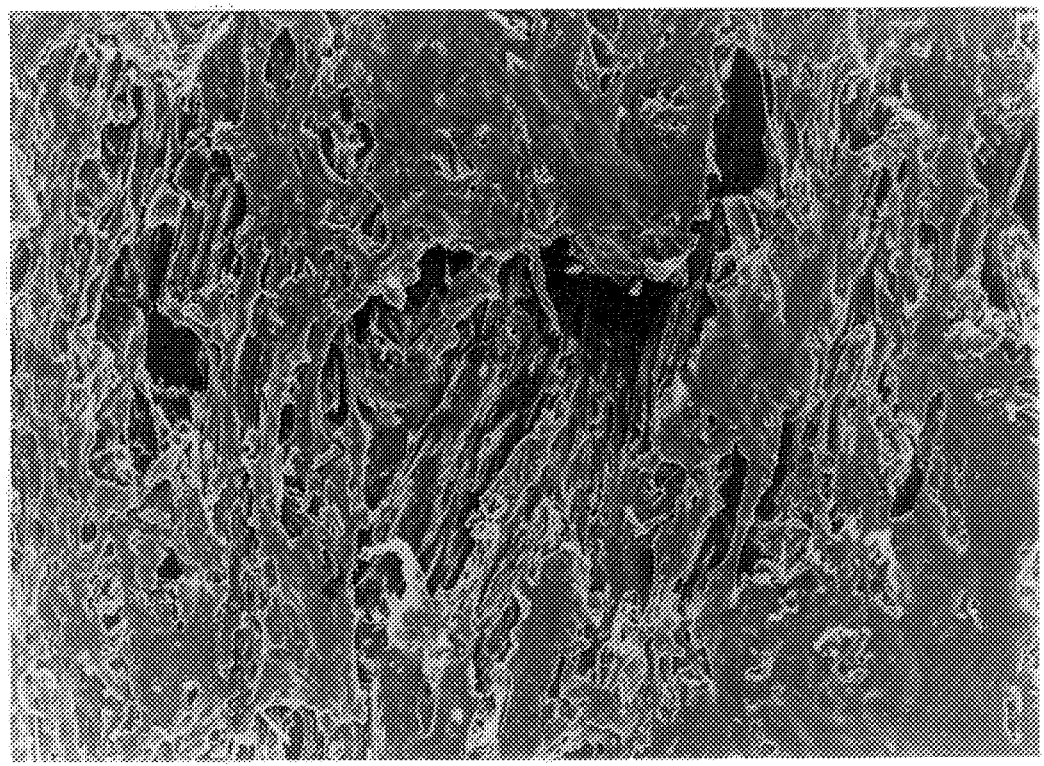
FIG. 16 is an enlarged scanning electron micrograph of FIG. 15 taken at 15 KV at 100× magnification.

The significance of the porosity is clearly shown in FIGS. 15–16, which are photographs of the natural fiber/PVC component only. FIG. 15 is an enlargement at 20× magnification taken at 15 KV with a 1 mm reference mark embedded in the picture. The porosity which is due to void formation, is clearly evident. At the higher magnification 100×, shown in FIG. 16, these voids are even more prevalent, as shown with the 100$\mu$ mark embedded therein. The samples were prepared by the teachings described above. In order to calculate porosity, the surface picture is digitized and with the aid of a software package, the amount of voids over a given area is calculated, based on black vs. white pixels. The porosity of the composite in these Figures is approximately 22%. Both samples show micro voids uniformly dispersed on the surface.

A comparative study was made regarding the impact of various variables which are present in the system. The variables studied were the effect of material pre-blending of all components with the exception of the wood flour, barrel zone temperatures 3&4, screw oil temperature, feed level, vent vacuum and die temperature. The following matrix (Table IV) was used to evaluate the effect of the six factors on the melt strength of natural fiber/PVC composite extrudates. Low melt strength has historically been one of the major problems experienced with this type of product.

TABLE IV

| Factor | Variable Range #1 | Variable Range #2 |
| --- | --- | --- |
| Starting Material | no pre-blending | pre-blending |
| Barrel 3&4 temp (°F.) | 295 | 335 |
| Screw Oil temp (°F.) | 365 | 395 |
| Feed level | flood | starve |
| Vent vacuum | 0.3 | 0.8 |
| Die temp (°F.) | 365 | 395 |

A partial factorial designed experiment was conducted with the above variables. Melt strength was measured by gradually increasing the puller speed until the line broke. A sample immediately prior to the break was retrieved, measured and weighed. From this data, it was possible to calculate the weight/inch of the part. The lower the number, the higher the melt strength.

The product made from the non-preblended material showed an 11.6% increase in melt strength. The higher barrel temperature also produced a product with 13.4% more melt strength, while increasing the vent vacuum resulted in 5.7% more melt strength. Screw oil temperature, feeder level and die temperature were shown to be essentially non-critical factors in determining melt strength.

Porosity determines the stainability of the final extrusion. The higher the porosity, the more stain it will absorb. Conversely, the lower the porosity, the less stain will be absorbed. A 22% porosity (void percentage) is preferred. Porosity in the range of 5% to 40% will stain, and the amount is a visual preference by the end-user.

DISCUSSION

In its most general terms, the interfacial agent can be envisioned to be a low to medium molecular weight, oxygen-containing hydrocarbon polymer. The oxygen-containing aspect of the polymer would include, but not be limited to, functionality of carboxylic acid groups, esters, ethers, alcohols, acrylates, etc. Depending upon the functional group contained within the polymer, the interfacial agent would attach by either a physisorption (e.g., hydrogen bonding) or chemisorption (e.g., ester bonding).

Figure 17:
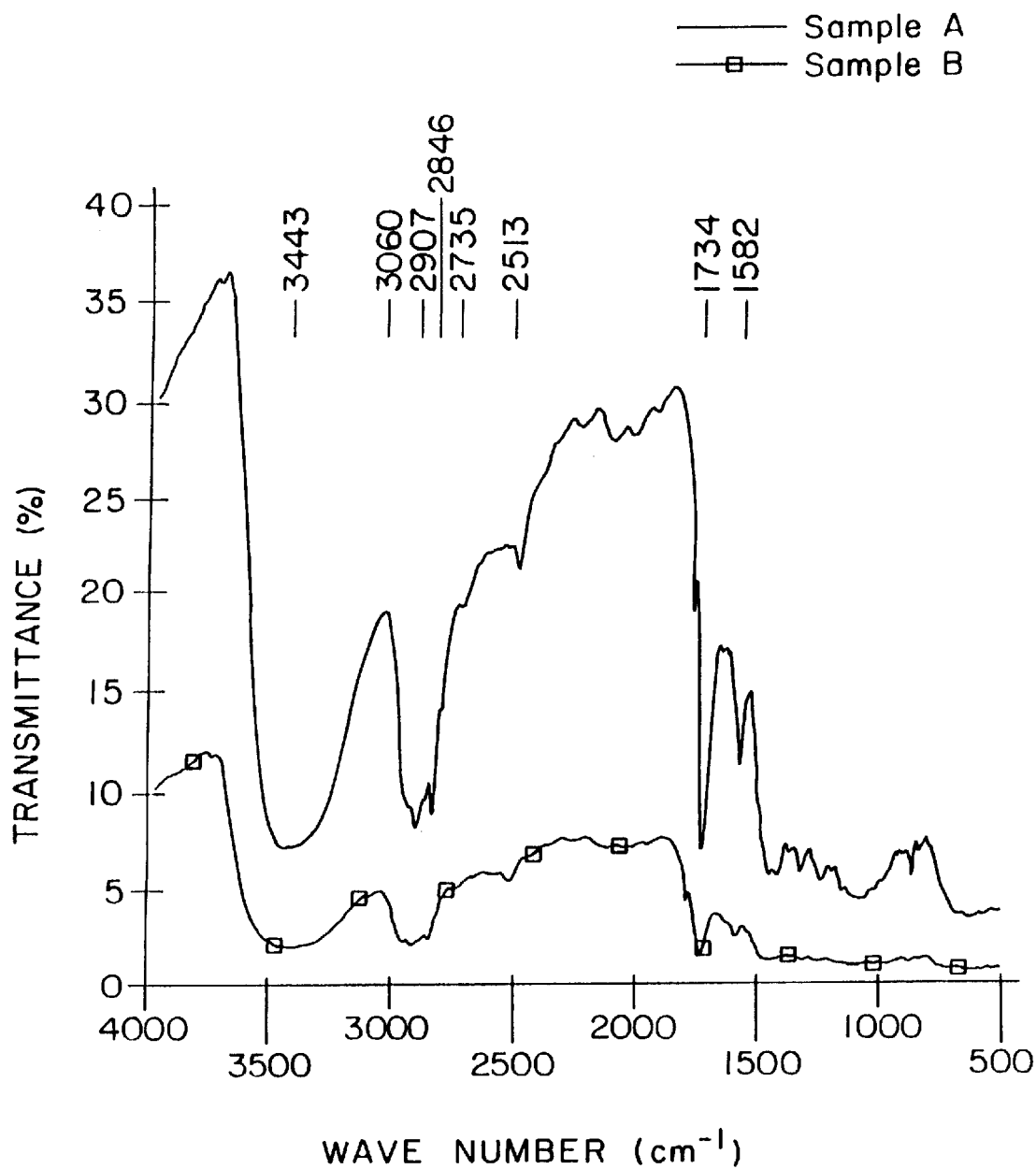
FIG. 17 is an FTIR spectra showing the affect of the addition of an interfacial agent wherein Sample A has an oxidized polyethylene as the interfacial agent and Sample B has no interfacial agent added.

As shown in FIG. 17, at least when using oxidized polyethylene [CAS 68441-17-8] as the interfacial agent, prepared in accordance with example #1, (Sample A) and without the addition of an interfacial agent (Sample B), Fourier Transform Infrared spectroscopy (FTIR) evidence points strongly to chemisorption as at least one operative mechanism with the formation of an ester bond between the interfacial agent and the cellulose, evidenced by the strong peak at 1734 cm$^{-1}$ (carbonyl stretch). This is a classic diagnostic for the presence of the carbonyl portion of the ester bond.

Specifically, two samples (A and B) were prepared by cutting an extruded section of material into pieces smaller than 0.5 cm on a side and grinding the pieces in a Waring commercial blender using a stainless steel sample jar and stainless steel blades. Approximately five (5) grams of material from each of the two samples were prepared in this fashion. The FTIR used was a Nicolet Magna IR 550 Series 2 operated in diffuse reflectance mode.

While the attention has been directed to oxygen-based chemistry, it is also envisioned that if chemisorption, possibly via ester formation is a reaction mechanism, then any carboxylic acid group contained within the polymer may work. It is also known that ester-type bonds can be formed from amides, acyl halides, ketones, nitriles and acrylates. Therefore, polymers which contain at least one or several of the bove functional groups would be useful in this invention. Amides react with alcohols under acidic conditions to produce an ester and an ammonium salt, instead of water as in the case of carboxylic acids.

It is also believed that the molecular weight of the interfacial agent is an aspect of this invention which will have a role in determining both the efficacy of the interfacial agent and in the final products of any composite which results therefrom. In general, it is believed that the molecular weight ($M_w$) of the interfacial agent should be less than or equal to 6,000 and greater than or equal to 100, more preferably less than or equal to 3,000 and greater than or equal to 200, and most preferably less than or equal to 1,500 and greater than or equal to 500.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A composite article comprising:
   a first zone, said first zone being comprised of a first polymer; and
   a second zone, said second zone being comprised of
      a second polymer,
      a natural cellulose-containing fiber,
      a porosity agent to control the porosity of said second zone, said second zone having an outer surface, said outer surface being porous to hold and retain wood stain or paint, said porosity agent being present in an amount of from 0.01 to 5% by weight inclusive and selected from the group consisting of a paraffin and a hydrocarbon wax blend; and
      an interfacial agent to aid in forming a homogeneous distribution of the natural cellulose-containing fiber in the second polymer, said interfacial agent being functionalized to the extent wherein at least one part of the interfacial agent can form a chemical or a physical bond to at least a portion of a cellulose component of the natural cellulose-containing fiber while at least one other portion of the interfacial agent aids in the compatibilization with the second polymer, said interfacial agent being present in an amount of from 0.01 to 2% by weight inclusive; and
   said first and second zones being integral and being coextruded together,
   said second zone having a porosity of between 5–40% inclusive.

2. The article of claim 1 wherein said second zone comprises
   from 90–45% by weight inclusive of said second polymer and
   from 10–55% by weight inclusive of said natural cellulose-containing fiber.

3. The composite of claim 1 wherein the porosity agent has a melting point of 200° F. or lower and the interfacial agent is a polymer having at least one linking group capable of forming said chemical or physical bond with said cellulose-containing fiber.

4. The composite of claim 3 wherein the interfacial agent is a polymeric surfactant.

5. The composite of claim 4 wherein the at least one linking group comprises oxygen.

6. The composite of claim 5 wherein at least one atom in the linking group is oxygen contained within a functional group in the polymeric surfactant, said functional group being selected from the group consisting of carboxylic acids, esters, ethers, acrylates, acid anhydrides, amides and alcohols.

7. The composite of claim 6 wherein the interfacial agent is selected from the group consisting of oxidized polyolefin, poly(ethylene-co-acrylic acid), poly(ethylene-co-methacrylic acid), poly(ethylene-co-methyl acrylate-co-acrylic acid), poly(methyl methacrylate-co-methacrylic acid), poly(tert-butyl acrylate-co-ethyl acrylate-co-methacrylic acid), poly(styrene-co-allyl alcohol), poly(vinyl alcohol-co-ethylene), carboxylated poly(vinyl chloride), poly(vinyl chloride-co-vinyl acetate-co-maleic anhydride, polyacrylamide, poly(acrylamide-co-acrylic acid), poly (methyl methacrylate), poly(ethyl methacrylate), poly (ethylene-co-ethyl acrylate), poly(butyl acrylate), poly (ethylene-co-ethyl acrylate-co-maleic anhydride), polystyrene-b-polyacrylic acid, polystyrene-b-polymethacrylic acid, polystyrene-b-polyvinyl alcohol, polystyrene-b-polyoxyethylene, hydroxyl functionalized polybutadiene, poly(vinyl chloride-co-vinyl acetate), poly (vinyl chloride-co-vinyl acetate-co-2-hydroxypropyl acrylate), poly(vinyl chloride-co-vinyl acetate-co-maleic acid).

8. The composite of claim 4 wherein the at least one linking group comprises nitrogen.

9. The composite of claim 8 wherein at least one atom in the linking group is nitrogen contained within a functional group in the polymeric surfactant, said functional group being selected from the group consisting of amines and nitrites.

10. The composite of claim 8 wherein the interfacial agent is selected from the group consisting of poly(acrylonitrile) and poly(acrylonitrile-co-butadiene).

11. The composite of claim 1 wherein the porosity agent is added in an amount of from 0.1% to 4% by weight.

12. The composite of claim 11 wherein the interfacial agent is added in an amount of from 0.05% to 1% by weight.

13. The composite of claim 1 wherein the first and second polymers are independently selected from the group consisting of polyolefins, polystyrenes, polyacrylics, polyvinyl chloride and polyesters.

14. The composite of claim 13 wherein the first and second polymers are different.

15. The composite of claim 13 wherein the first and second polymers are the same.

16. The composite of claim 15 wherein the first and second polymers are polyvinyl chloride.

17. The composite of claim 1 wherein the natural cellulose-containing fiber is wood flour.

18. A composite article comprising:
   a first zone, said first zone being comprised of a polyvinyl chloride polymer; and
   a second zone, said second zone being comprised of
      a polyvinyl chloride polymer,
      a natural cellulose-containing fiber,
      a porosity agent to control the porosity of said second zone, said second zone having an outer surface, said outer surface being porous to hold and retain wood stain or paint, said porosity agent being present in an amount of from 0.01 to 5% by weight inclusive and selected from the group consisting of a paraffin and a hydrocarbon wax blend; and an interfacial agent to form a homogeneous melt of the natural cellulose-containing fiber and the second polymer, said interfacial agent being functionalized to the extent wherein at least one part of the interfacial agent can form a chemical or a physical bond to at least a portion of a cellulose component of the natural cellulose-containing fiber while at least one other portion of the interfacial agent aids in the compatibilization with the second polymer, said interfacial agent being present in an amount of from 0.01 to 2% by weight inclusive; and said first and second zones being integral and being coextruded together, said second zone having a porosity of between 5–40% inclusive.

19. The article of claim 18 wherein
said second zone comprises
from 90–45% by weight inclusive of polyvinyl chloride polymer and
from 10–55% by weight inclusive of said natural cellulose-containing fiber.

20. The composite of claim 18 wherein the porosity agent has a melting point of 200° F. or lower and the interfacial agent is a polymer having at least one linking group capable of forming said chemical or physical bond with said cellulose-containing fiber.

21. The composite of claim 20 wherein the interfacial agent is a polymeric surfactant.

22. The composite of claim 21 wherein the at least one linking group comprises oxygen.

23. The composite of claim 22 wherein at least one atom in the linking group is oxygen contained within a functional group in the polymeric surfactant, said functional group being selected from the group consisting of carboxylic acids, esters, ethers, acrylates, acid anhydrides, amides and alcohols.

24. The composite of claim 23 wherein the interfacial agent is selected from the group consisting of oxidized polyolefin, poly(ethylene-co-acrylic acid), poly(ethylene-co-methacrylic acid), poly(ethylene-co-methyl acrylate-co-acrylic acid), poly(methyl methacrylate-co-methacrylic acid), poly(tert-butyl acrylate-co-ethyl acrylate-co-methacrylic acid), poly(styrene-co-allyl alcohol), poly(vinyl alcohol-co-ethylene), carboxylated poly(vinyl chloride), poly(vinyl chloride-co-vinyl acetate-co-maleic anhydride, polyacrylamide, poly(acrylamide-co-acrylic acid), poly(methyl methacrylate), poly(ethyl methacrylate), poly(ethylene-co-ethyl acrylate), poly(butyl acrylate), poly(ethylene-co-ethyl acrylate-co-maleic anhydride), polystyrene-b-polyacrylic acid, polystyrene-b-polymethacrylic acid, polystyrene-b-polyvinyl alcohol, polystyrene-b-polyoxyethylene, hydroxyl functionalized polybutadiene, poly(vinyl chloride-co-vinyl acetate), poly(vinyl chloride-co-vinyl acetate-co-2-hydroxypropyl acrylate), poly(vinyl chloride-co-vinyl acetate-co-maleic acid).

25. The composite of claim 21 wherein the at least one linking group comprises nitrogen.

26. The composite of claim 25 wherein at least one atom in the linking group is nitrogen contained within a functional group in the polymeric surfactant, said functional group being selected from the group consisting of amines and nitriles.

27. The composite of claim 26 wherein the interfacial agent is selected from the group consisting of poly(acrylonitrile) and poly(acrylonitrile-co-butadiene).

28. The composite of claim 18 wherein the porosity agent is added in an amount of from 0.1% to 4% by weight.

29. The composite of claim 28 wherein the interfacial agent is added in an amount of from 0.05% to 1% by weight.

30. The composite of claim 18 wherein the natural cellulose-containing fiber is wood flour.

31. A composite article comprising:
a first zone, said first zone being comprised of a first polymer; and
a second zone, said second zone being comprised of
a second polymer,
a natural cellulose-containing fiber,
a porosity agent to control the porosity of said second zone, said second zone having an outer surface, said outer surface being porous to hold and retain wood stain or paint; and
an interfacial agent to aid in forming a homogeneous distribution of the natural cellulose-containing fiber in the second polymer, said interfacial agent having at least one portion which is hydrophilic and at least one other portion wich is hydrophobic;
said porosity agent and interfacial agent interacting and combined in a ratio to obtain fusion of said second polymer and natural cellulose-containing fiber, and a porosity of between 5–40% inclusive in said second zone; and
said first and second zones being integral and being coextruded together.

32. The article of claim 31 wherein
said second zone comprises
from 90–45% by weight inclusive of said second polymer and
from 10–55% by weight inclusive of said natural cellulose-containing fiber.

33. The composite of claim 32 wherein the porosity agent is selected from the group consisting of paraffin or hydrocarbon wax blend having a melting point of 200° F. or lower and the interfacial agent is a polymer having at least one linking group capable of forming said chemical or physical bond with said cellulose-containing fiber.

34. The composite of claim 33 wherein the interfacial agent is a polymeric surfactant.

35. The composite of claim 34 wherein the at least one linking group comprises oxygen.

36. The composite of claim 35 wherein at least one atom in the linking group is oxygen contained within a functional group in the polymeric surfactant, said function group selected from the group consisting of carboxylic acids, esters, ethers, acrylates, acid anhydrides, amides and alcohols.

37. The composite of claim 36 wherein the interfacial agent is selected from the group consisting of oxidized polyolefin, poly(ethylene-co-acrylic acid), poly(ethylene-co-methacrylic acid), poly(ethylene-co-methyl acrylate-co-acrylic acid), poly(methyl methacrylate-co-methacrylic acid), poly(tert-butyl acrylate-co-ethyl acrylate-co-methacrylic acid), poly(styrene-co-allyl alcohol), poly(vinyl alcohol-co-ethylene), carboxylated poly(vinyl chloride), poly(vinyl chloride-co-vinyl acetate-co-maleic anhydride, polyacrylamide, poly(acrylamide-co-acrylic acid), poly(methyl methacrylate), poly(ethyl methacrylate), poly(ethylene-co-ethyl acrylate), poly(butyl acrylate), poly(ethylene-co-ethyl acrylate-co-maleic anhydride), polystyrene-b-polyacrylic acid, polystyrene-b-polymethacrylic acid, polystyrene-b-polyvinyl alcohol, polystyrene-b-polyoxyethylene, hydroxyl functionalized polybutadiene, poly(vinyl chloride-co-vinyl acetate), poly(vinyl chloride-co-vinyl acetate-co-2-hydroxypropyl acrylate), poly(vinyl chloride-co-vinyl acetate-co-maleic acid).

38. The composite of claim 34 wherein the at least one linking group comprises nitrogen.

39. The composite of claim 38 wherein at least one atom in the linking group is nitrogen contained within a functional group in the polymeric surfactant, said functional group being selected from the group consisting of amines and nitriles.

40. The composite of claim 39 wherein the interfacial agent is selected from the group consisting of poly(acrylonitrile) and poly(acrylonitrile-co-butadiene).

41. The composite of claim 31 wherein the porosity agent is added in an amount of from 0.01 to 5% by weight.

42. The composite of claim 41 wherein the porosity agent is added in an amount of from 0.1% to 4% by weight.

43. The composite of claim 31 wherein the interfacial agent is added in an amount of from 0.01% to 2% by weight.

44. The composite of claim 43 wherein the interfacial agent is added in an amount of from 0.05% to 1% by weight.

45. The composite of claim 31 wherein the first and second polymers are independently selected from the group consisting of polyolefins, polystyrenes, polyacrylics, polyvinyl chloride and polyesters.

46. The composite of claim 45 wherein the first and second polymers are different.

47. The composite of claim 45 wherein the first and second polymers are the same.

48. The composite of claim 47 wherein the first and second polymers are polyvinyl chloride.

49. The composite of claim 31 wherein the natural cellulose-containing fiber is wood flour.

* * * * *